United States Patent
Wallgren

(10) Patent No.: US 6,680,601 B2
(45) Date of Patent: Jan. 20, 2004

(54) CIRCUIT AND METHOD FOR POWER MEDIATION IN ELECTRONIC DEVICE

(75) Inventor: Markus Wallgren, San Francisco, CA (US)

(73) Assignee: Telespree Communications, San Francisco, CA (US)

( * ) Notice: Subject to any disclaimer, the term of this patent is extended or adjusted under 35 U.S.C. 154(b) by 12 days.

(21) Appl. No.: 10/160,577

(22) Filed: May 31, 2002

(65) Prior Publication Data

US 2003/0222625 A1 Dec. 4, 2003

(51) Int. Cl.$^7$ .............................................. H01M 10/44
(52) U.S. Cl. ....................................................... 320/166
(58) Field of Search ................................ 320/104, 134, 320/136, 149, 166

(56) References Cited

U.S. PATENT DOCUMENTS

| | | | |
|---|---|---|---|
| 5,036,532 A | 7/1991 | Metroka et al. | 379/58 |
| 5,377,256 A | 12/1994 | Franklin et al. | 379/59 |
| 5,404,586 A | 4/1995 | Ishiguro | 455/126 |
| 5,444,378 A | 8/1995 | Rogers | 324/428 |
| 5,574,353 A | 11/1996 | Bai et al. | 320/14 |
| 5,587,250 A | 12/1996 | Thomas et al. | 429/3 |
| 5,717,319 A | 2/1998 | Jokinen | 323/280 |
| 5,774,813 A | 6/1998 | Jokinen | 455/574 |
| 5,790,961 A | 8/1998 | Ingram et al. | 455/574 |
| 5,838,554 A | 11/1998 | Lanni | 363/21 |
| 5,849,426 A | 12/1998 | Thomas et al. | 429/7 |
| 5,861,736 A | 1/1999 | Corsi et al. | 323/273 |
| 5,955,869 A | 9/1999 | Rathmann | 320/132 |
| 5,968,684 A | 10/1999 | Hayashi et al. | 429/223 |
| 6,025,695 A | 2/2000 | Friel et al. | 320/106 |
| 6,031,353 A | 2/2000 | Banyas et al. | 320/112 |
| 6,049,724 A | 4/2000 | Rozenblit et al. | 455/572 |
| 6,074,775 A | 6/2000 | Garstein et al. | 429/53 |
| 6,091,611 A | 7/2000 | Lanni | 363/21 |
| 6,097,973 A | 8/2000 | Rabe et al. | 455/572 |

*Primary Examiner*—Edward H. Tso
(74) *Attorney, Agent, or Firm*—Glenn Patent Group; Michael A. Glenn

(57) ABSTRACT

A power mediation method and circuit for powering a communications controller based device using battery cells that exhibit non stable power delivery characteristics. The use of a servo-loop creates an energy potential in an energy storage element and maintains that required energy potential using the functionality of the communications controller that concurrently draws required power from the energy storage element.

19 Claims, 2 Drawing Sheets

CIRCUIT AND METHOD FOR POWER MEDIATION IN ELECTRONIC DEVICE

BACKGROUND OF THE INVENTION

Alkaline primary cell batteries are the preferred choice of batteries for many portable electronic applications due to the high availability of such batteries and the relatively inexpensive cost. Alkaline primary cells are however not preferred for electronic applications that are sensitive to voltage variations due to inherent variations in alkaline cell voltage, which only worsens as the alkaline cells age. This limitation disqualifies alkaline batteries for many portable electronic applications where the application of such battery type would otherwise be desirable.

For example, typical cellular telephone integrated circuit components are designed to operate within a narrow supply voltage range centered about 3.6 Volts. The 3.6 Volt operating voltage is particularly well suited to popular rechargeable battery chemistries including NiMH and LiIon which can sustain a relatively constant output voltage throughout battery lifetime. NiMH and LiIon battery types are however relatively expensive in comparison to alkaline battery types. Thus, it would be desirable to be able to use alkaline primary cells without having to suffer the adverse consequences discussed above.

SUMMARY OF THE INVENTION

The present invention generally comprises a power mediation method and circuit for powering a communications controller based device using battery cells that exhibit non stable power delivery characteristics. The invention comprises the use of a servo-loop to create an energy potential in an energy storage element and maintain that required energy potential using the functionality of the communications controller. Thus, the communications controller is used to maintain a minimum power availability on the energy storage element as it concurrently draws required power from the energy storage element.

DETAILED DESCRIPTION OF THE EMBODIMENT

Figure 1A:
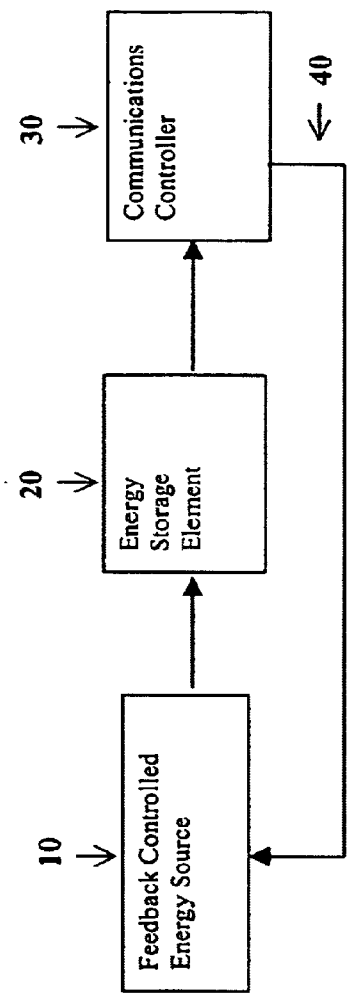
FIG. 1a depicts a block diagram of the present invention.

The circuit of the preferred embodiment comprises a feedback controlled energy source 10 and an energy storage element 20 coupled to the communications controller 30 having at least a sampling device and a Central Processing Unit (CPU). See FIG. 1a. The CPU is under software control to implement a comparison function and an output function. At power up, the circuit gradually increases the energy stored on the energy storage element 20 until the power supplied to the communications controller 30 enables normal operating conditions. At such time that normal operating conditions begin, software controlling the controller 30 CPU causes both a sampling of the energy stored on the energy storage element 20 and a subsequent comparison of the sampled voltage to a reference voltage. The reference voltage is selected to ensure satisfaction of minimum acceptable power requirements.

Upon satisfaction of the minimum acceptable power requirements, the controller 30 enables a feedback signal 40 output that switches off the energy supplied to the energy storage element 20. Thus, a servo-loop is established to maintain an acceptable energy availability on the energy storage element 20.

Figure 1B:
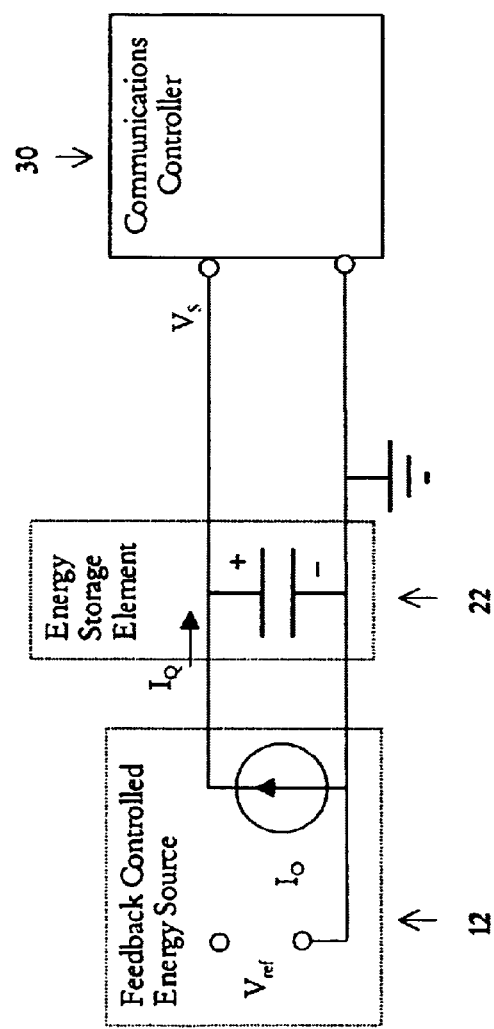
FIG. 1b depicts a first embodiment of the present invention.

In a first embodiment, the energy storage element 20 comprises an electrolytic capacitor 22 and the feedback controlled energy source 10 comprises a voltage controlled current source 12. See FIG. 1b. The servo-loop charges the capacitor 22 according to the following requirements:

$$I_Q = I_O \text{ for } V_{MIN} \leq V_S < V_{MAX}$$

$$I_Q = 0 \text{ for } V_S > V_{MAX}$$

where $V_S$ is the voltage supplied to the communications controller 30 and $V_{MIN}$ and $V_{MAX}$ are the minimum and maximum voltage to be applied to the controller 30 as specified by the controller manufacturer, respectively.

Figure 2:
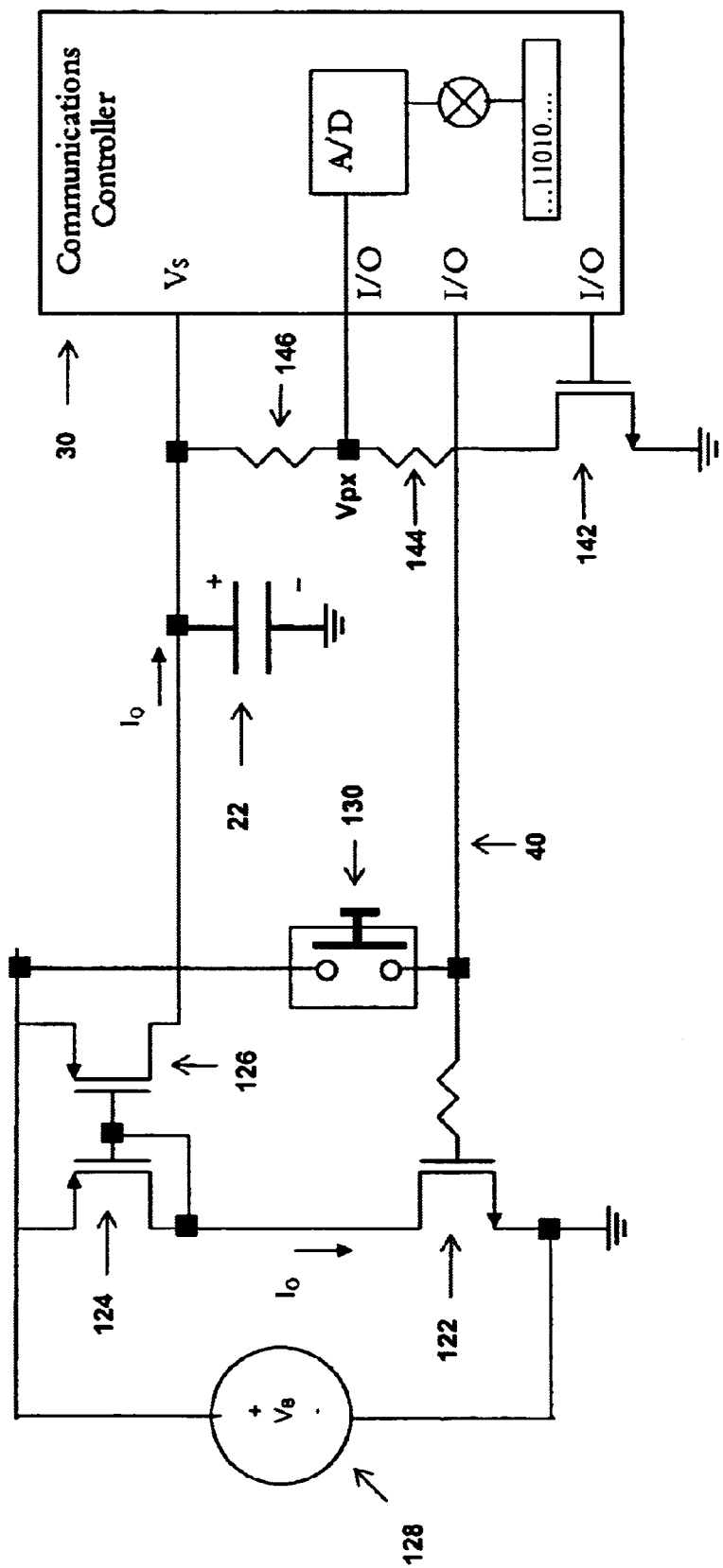
FIG. 2 depicts more detail of the first embodiment.

FIG. 2 depicts further detail of an implementation of the first embodiment wherein the voltage controlled current source 12 is comprised of a first Field Effect Transistor (FET) 122 configured as a controllable switch to turn on and off a current source comprised of a second FET 124, a third FET 126, and at least one primary cell 128 A spring-biased mechanical switch 130 enables a start-up current to charge the capacitor 22. In this embodiment, the primary cell 128 is comprised of a series coupling of a plurality of alkaline primary cells. The circuit depicted in FIG. 2 is illustrative only and an ordinarily skilled practitioner in the art would appreciate that equivalent feedback controlled energy sources could be configured with various available electrical components.

The controller 30 enters normal operating conditions as the voltage supplied to the controller 30 traverses an acceptable minimum power supply voltage. Subsequently, software in control of the CPU enables a comparator device (e.g. analog to digital converter) of the controller 30 to sample the power supply voltage applied to the controller 30 and render a digital representation of the power supply voltage. Further, as depicted in FIG. 2, a proxy reference voltage (Vpx) is developed from the applied power supply voltage (Vs) using an energy level shifting circuit. Thus, Vpx is sampled rather than the actual voltage supplied to the controller by the capacitor 22. This ensures that the sampled voltage will be within the range of the comparator device of the controller 30.

In the depicted embodiment, the energy level shifting circuit comprises a voltage divider comprised of a first resistor 144, a second resistor 146, and a FET 142. FET 142 is coupled to the controller 30 to permit software control of the current through the resistors 144 and 146. Moreover, relatively large values for both resistors 144 and 146 (e.g. both 10K) further enable a minimal draw of quiescent current.

The controller 30 CPU operates under software control to determine failure to meet minimum acceptable criteria. Thus in the depicted embodiment, the controller 30 compares (e.g. subtracts) the sampled digital representation of Vpx to a first reference bit sequence representing a minimum acceptable proxy reference voltage ($Vpx_{MIN}$), and optionally, further compares the sampled digital representation of Vpx to a second reference bit sequence representing a maximum acceptable proxy reference voltage ($Vpx_{MAX}$). An input/output (I/O) port of the controller 30 is configured and controlled by a software to output the feedback signal 40. See FIG. 2. It follows that the controller 30 outputs the feedback signal 40 and enables the feedback controlled energy source 10 to establish the following control conditions;

$I_Q = I_O$ for $Vpx_{MIN} < Vpx \leq Vpx_{MAX}$ $I_Q = 0$ for $Vpx > Vpx_{MAX}$.

The preferred embodiment contemplates wireless communications applications. Thus, it is likely that the greatest power requirements will occur during a wireless transmission. In such an implementation of the preferred embodiment, the loop must sample, compare, and replenish the charge stored on the capacitor 22 fast enough to maintain normal operating conditions.

Accordingly, although the invention has been described in detail with reference to particular preferred embodiments, persons possessing ordinary skill in the art to which this invention pertains will appreciate that various modifications and enhancements may be made without departing from the spirit and scope of the claims that follow.

What is claimed is:

1. A method of powering an communications controller, comprising:

charging an energy storage element from a coupled feedback controlled energy source;

drawing power from the energy storage element to power the communications controller; and with circuitry available within a communications controller, sampling the energy potential available on the energy storage element, comparing the energy potential available on the energy storage element to determine failure to meet a minimum acceptable criteria, and if that criteria is not met, enabling a feedback signal output which is coupled to the feedback controlled energy source thereby enabling the coupled feedback controlled energy source to charge the energy storage element.

2. The method of claim 1 wherein, the energy storage element comprises an passive component.

3. The method of claim 2 wherein, the passive component is selected from the group consisting of an inductor or a capacitor.

4. The method of claim 1 wherein, the coupled feedback controlled energy source includes a controllable current source.

5. The method of claim 1 wherein, the coupled feedback controlled energy source includes at least one alkaline primary cell coupled to a switch.

6. The method of claim 1 wherein, the coupled feedback controlled energy source includes a controllable current source coupled to at least one alkaline primary cell.

7. The method of claim 1 wherein, the step of sampling the energy potential available on the energy storage element is facilitated with a comparator device within the communications controller to render a digital representation of the energy potential available.

8. The method of claim 7 wherein, the comparator device is an analog to digital converter.

9. The method of claim 7 wherein, the step of comparing the energy potential available on the energy storage element comprises performing a mathematical operation on the rendered digital representation using an internally applied reference bit sequence.

10. The method of claim 7 wherein, the step of sampling the energy potential available on the energy storage element comprises sampling a proxy reference voltage that is developed from the energy potential available on the energy storage element.

11. A power supply circuit for a micro controller having a sampling device and a central processing unit and method for controlling a comparing function and a first output port, the power supply circuit comprising:

an energy source coupled through a controllable switch to, an energy storage device, the energy storage device further coupled to the micro controller, and the method comprising:

with the micro controller, sampling the energy stored on the energy storage device and comparing the sampled energy to determine failure to meet a minimum acceptable criteria; and if the minimum acceptable criteria is not met, enabling the first output port to toggle the controllable switch and charge the energy storage device.

12. The power supply circuit of claim 11 wherein, the energy source includes at least one alkaline primary cell.

13. The power supply circuit of claim 11 wherein, the controllable switch is coupled to and controlled by the first output port of the micro controller.

14. The power supply circuit of claim 11 wherein, the energy storage element comprises a capacitor, which is coupled to the energy source, and the energy source includes a current source coupled to at least one primary battery cell by the controllable switch.

15. The power supply circuit of claim 14 wherein, the current source includes a voltage controlled current source that is configured with a plurality of alkaline primary cells.

16. The power supply circuit of claim 11 further comprising, an energy level shifting circuit that creates a proxy reference energy level dependent upon the energy stored on the energy storage device that is sampled by the micro controller to determine failure to meet a minimum acceptable criteria.

17. The power supply circuit of claim 16 wherein, the energy level shifting circuit comprises a voltage divider.

18. The power supply circuit of claim 16 wherein, the energy level shifting circuit further comprises a FET coupled to the voltage divider and also coupled to and controlled by a second output port of the micro controller.

19. A feedback and charging circuit for powering a communications controller from at least one alkaline primary cell; the communications controller including a CPU with memory, a sampling device, a comparing device and a first output port, the CPU under software control to control the included devices and port; the feedback and charging circuit comprising a switch, coupled to and controlled by the first output port, the switch coupled to and in control of a charging source, the charging source comprised of a current source supplied from the at least one alkaline primary cell, the current source coupled to a capacitor and a power supply input of the communications controller.

* * * * *